United States Patent [19]

Schermutzki

[11] Patent Number: 4,790,257

[45] Date of Patent: Dec. 13, 1988

[54] APPARATUS FOR THE PRODUCTION OF FIBER WEB REINFORCED PLASTIC LAMINATES

[75] Inventor: Konrad Schermutzki, Remseck, Fed. Rep. of Germany

[73] Assignee: Santrade Ltd., Lucerne, Switzerland

[21] Appl. No.: 923,124

[22] Filed: Oct. 24, 1986

[30] Foreign Application Priority Data

Nov. 14, 1985 [DE] Fed. Rep. of Germany ....... 3540388

[51] Int. Cl.$^4$ .............................................. B05C 19/00
[52] U.S. Cl. ...................................... 118/227; 118/57; 118/65; 118/642; 118/643; 156/181; 156/283; 264/70; 264/131; 264/136
[58] Field of Search ................... 118/57, 65, 227, 641, 118/642, 643; 156/73.6, 283, 322, 441, 155, 180, 181, 309.6; 264/70, 118, 129, 130, 131, 134, 136, 137, 144, 165, 166, 167, 210.1, 210.3, 210.4, 213; 65/3, 4

[56] References Cited

U.S. PATENT DOCUMENTS

| | | | |
|---|---|---|---|
| 3,511,680 | 5/1970 | Marcell et al. | 118/227 UX |
| 3,667,422 | 6/1972 | Saladin | 118/641 |
| 3,682,738 | 8/1972 | Smith | 156/283 |
| 3,865,661 | 2/1975 | Hata et al. | 156/283 |
| 3,958,039 | 5/1976 | Yabuki et al. | 118/642 |
| 4,239,580 | 12/1980 | Ives | 156/73.6 |
| 4,250,129 | 2/1981 | Winstead | 264/210.1 |
| 4,288,400 | 9/1981 | Winstead | 264/210.1 |
| 4,396,566 | 8/1983 | Brinkmann et al. | 264/70 |
| 4,487,647 | 12/1984 | Semeghini et al. | 156/322 |
| 4,594,266 | 6/1986 | Lemaire et al. | 118/643 |
| 4,626,306 | 12/1986 | Chabrier et al. | 156/180 |

FOREIGN PATENT DOCUMENTS

| | | |
|---|---|---|
| 1588864 | 4/1970 | France . |
| 2516441 | 5/1983 | France . |
| 540762 | 10/1973 | Switzerland . |
| 722590 | 3/1980 | U.S.S.R. . |
| 1227910 | 4/1971 | United Kingdom . |
| 1259084 | 1/1972 | United Kingdom . |

*Primary Examiner*—Jay H. Woo
*Assistant Examiner*—C. Scott Bushey
*Attorney, Agent, or Firm*—Burns, Doane, Swecker & Mathis

[57] ABSTRACT

A fiber web reinforced plastic is formed by applying dry resin powder to opposite sides of a vertically moving web, and then melting and pressing the power into the web. The dry powder is applied to the web by being thrown thereagainst. The powder thus more effectively occupies the voids in the web to minimize the presence of air in the web. The thrown-on powder can be melted before the laminating pressure is applied.

23 Claims, 3 Drawing Sheets

APPARATUS FOR THE PRODUCTION OF FIBER WEB REINFORCED PLASTIC LAMINATES

BACKGROUND AND OBJECTS OF THE INVENTION

The invention concerns a process and an apparatus for the production of plastic, in particular, thermoplastic laminates reinforced with a fiber web, wherein resin is applied to the fiber web in powder form, melted under the effect of pressure and temperature while pressed against the reinforcing webs to form a laminate.

Processes and apparatuses for the production of plastic laminates are known. Thus, for example, a process is known from German Pat. No. OS-23 12 816, in which two glass fiber mats are converged together at an angle and guided in a press gap between two rolls rotating in opposite directions. One of the rolls is a reversing or supporting roll for an endless belt which forces the circumference of the other roll to form therewith a press gap in which the glass fiber mats are acted upon by a predetermined pressure. Between the two glass fiber mats the resin is inserted in the form of an extruded strand which is to be pressed into the glass fiber mats during passage through the press gap. A similar effect is obtained when two endless belts are provided, which include mutually facing vertical flights between which are introduced the glass mats. A certain disadvantage of these known techniques involves the fact that undesirable air bubbles may be included with the resin and pressed into the laminate.

A process and an apparatus of the aforementioned type described in French Pat. No. 20 73 334 is further known, in which the resin is applied in powder form to the top side of a covering foil sheet which is transported on an endless belt. Thereafter, a reinforcing fiber web is placed on the powder layer, and the exposed side of the web is also provided with a layer of powder. The reinforcing fiber web is thus conducted while embedded on both sides in a layer of resin powder and is subsequently press-formed into a laminate in a press under the effect of heat, optionally with the addition of further reinforcing webs and layers of powder. A disadvantage consists of the fact that the resin powder penetrates differentially from the bottom and the top sides of the reinforcing fiber web, so that after pressing, a laminate with an asymmetrical structure is obtained. Another disadvantage involves the risk that air may be included in the pressing zone, because, as in other known processes, the resin is only capable of filling all of the cavities of the reinforcing fiber web when in the liquid state rather than in a powder state.

It is, therefore, an object of the invention to enable the reinforcing fiber mats to be impregnated while minimizing the inclusion of air and in such manner that a laminate with a symmetrical structure is obtained.

SUMMARY OF PREFERRED EMBODIMENTS OF THE INVENTION

These objects are attained wherein a reinforcing fiber web is transported in an approximately vertical direction and resin powder is applied in the form of a dry pourable powder mixture to both sides of the reinforcing fiber web simultaneously and symmetrically. It is particularly advantageous to throw the resin powder mixture against both sides of the reinforcing fiber web as the web is being conveyed downward in the vertical direction. By this process the resin powder is able to coat the individual fibers of the web so that during subsequent heating and pressing the resin is not obliged to pass over long flow distances. This process also insures the penetration of the resin into the reinforcing fiber mats, in particular, into glass fiber mats, without air bubbles, as the powder, which cannot hold air bubbles, tends to fill the voids between the mat fibers. It is further advantageous to heat the vertically moving reinforcing fiber mat prior to the application of the laminating pressure so that the resin powder begins to melt. In this manner any remaining air bubbles may escape even during the melting process.

The coating of the web fibers by the resin powder may be further improved by oscillating the web back and forth transversely to the conveying direction while the powder is being thrown onto the web, so that the resin powder penetrates even into deeper voids of the web.

The reinforcing fiber pretreated in this manner may be subsequently pressed in a twin belt press or a calender into a laminate nearly free of air inclusions, wherein the flow paths of the resin that has already penetrated into the reinforcing fiber web in the powder form, are very short. This makes possible the use of thermoplastics with poor flow characteristics and thus unfavorable extrusion properties, but which yield higher mechanical properties of the laminate.

Pressing of the mat is preferably achieved by a pair of rolls rotating in opposite directions around parallel axles, with the web being drawn between the rolls. Each of the rolls is equipped at its upper peripheral zone with a feeder device for the application of a layer of resin powder. The feeder device may consist conveniently of a vessel seated on the circumference of the roll, the wall of the vessel facing the roll gap forming an outlet slot together with the circumference of the roll. The resin powder filled into the vessel then exits uniformly from the outlet slot as a consequence of the rotation of the roll. The accurate metering of the resin powder on both sides of the reinforcing fiber mats may be obtained by providing in the direction of rotation of the rolls, spaced apart from the outlet slot, additionally a weir-defining retaining body extending parallel or at an angle of approximately 15 degrees to the axis of the roll. Such a retainer may comprise a tight piece of wire, which retains a uniform layer of the resin powder in the zone extending to the outlet slot and permits the running of the powder uniformly in the direction of the reinforcing fiber mat in the manner of an overflow weir. The resin powder accelerated in this manner by the rotation of the rolls and by gravity, is thrown into the voids of the reinforcing fiber web moving transversely to it. This configuration assures accurate metering, because the proportion of the powder introduced cannot be affected by frictional conditions between the rotating roll surface and the powder.

BRIEF DESCRIPTION OF THE DRAWING

The objects and advantages of the invention will become apparent from the following detailed description of preferred embodiments thereof in connection with the accompanying drawings in which like numerals designate like elements, and in which.

DETAILED DESCRIPTION OF PREFERRED EMBODIMENTS OF THE INVENTION

Figure 1:
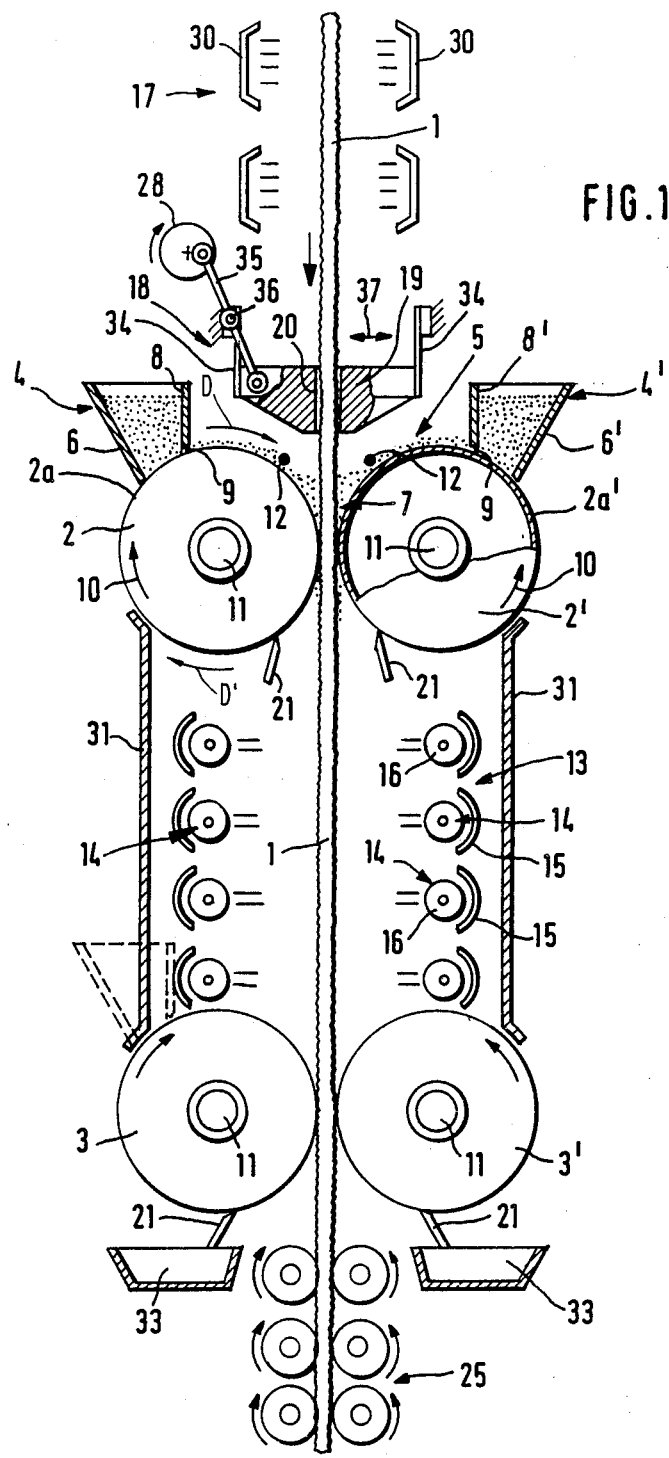
FIG. 1 is a schematic vertical sectional view of a novel apparatus for the production of glass fiber reinforced plastic laminates, in which a glass fiber mat is impregnated with plastic resin.

In FIG. 1, two identical hollow rolls 2, 2' rotate on axles 11, 11 which are located in a common horizontal plane. Between these rolls 2, 2' a web 1 of a textile glass fiber mat is passed in an approximately vertical direction. A second pair of rolls 3, 3' is located below the pair of rolls 2, 2', the individual rolls 3, 3' being similar in configuration than the rolls 2, 2'. The second rolls 3, 3' are hollow and rotate on parallel axles 11 which are located in a common plane. The glass fiber mat 1 also passes between the second rolls 3, 3'. Both roll pairs are maintained at a temperature sufficient to assure that no resin adheres to them. For this purpose a heating medium, for example water, circulates through the hollow axles 11.

In the upper peripheral zones 2a, 2a' of the first pair 2, 2' of rolls, feeder devices 4, 4' are set on the roll circumferences. Each of those devices comprises a vessel 6, 6' filled with a pourable powder of a thermoplastic resin with a grain size no greater than approximately 2 mm, preferably from 0.05 to 0.5 mm. The wall 8 of each vessel 6, 6' facing the roll gap 7 between the two rolls 2, 2' is not seated on the circumference 2a, 2a' of the associated roll 2, 2', but forms with the circumference of said roll an outlet slot 9, through which a layer 5 of the powder may exit and fall upon the roll circumference as the latter travels in a first direction D converging with the web. In the course of the motion of the two rolls in opposing directions 10 the powder is entrained by the periphery of the rolls. A straight piece of wire 12 is arranged parallel to the axles 11 adjacent the web to form a kind of retaining weir for retaining the powder 5. The weir may contact the roll periphery (or be slightly spaced therefrom but insufficient to prevent powder from traveling between the weir and the roll). The powder runs over the weirs 12 in the course of the rotation of the rolls 2, 2' and is thus loosely disposed on the roll periphery. The powder is subsequently accelerated both by contact with the surface of the rotating rolls and by the force of gravity and is thus thrown (propelled) transversely against the reinforcing fiber web moving in the vertical direction as the direction of travel of the roll circumference changes from the first direction D to a second direction D' away form the web. The resin powder thrown in that manner very effectively enters the voids of the glass fiber mat 1 upstream of the roll gap 7. The web 1 of the glass fiber mat is therefore powdered uniformly with dry resin powder from both sides prior to reaching the narrowest point in the roll gap 7. This resin powder is then pressed lightly against the outside of the glass fiber mat 1 by the line pressure applied by the two rolls 2, 2', so that at least the major portion of the powder will adhere to the mat. Enhancement of that adhesion is effected by heating the glass fiber mat 1 prior to reaching the roll gap 7 by means of radiators 30 which together form a heating installation 17. The mat is heated at least to the extent that a certain adhesion of the resin powder takes place, which adhesion is then reinforced by the contact pressure of the rolls. The size of the gap 7 is variable, as is the contact pressure of the rolls. The wire 12, instead of being parallel to the roll axis, may extend at a slight angle (e.g., 15 degrees) relative thereto.

In the zone between the two pairs of rolls 2, 2' and 3, 3' a space is provided which is insulated by a jacket-like housing 31. A further heating installation 13 in the form of several vertically spaced infrared radiators 14 is installed in that space. On their side facing away from the web 1 all of the infrared radiators 14 are equipped with reflectors 15, for example in the shape of paraboloids, which may be plated (e.g., with gold) in order to largely prevent the adhesion of resin powder. The protective quartz tubes 16 of the infrared radiators 14 themselves may be cooled at their surface in a manner not shown in detail, for example by air or liquid cooling so that the adhesion of resin powder is largely prevented. Any resin powder that does not adhere to the web 1 of the glass fiber mat and does not penetrate into the web 1, is therefore able to drop down within the area of the glass fiber mat only. Any resin adhering to the circumference of the rolls 2, 2' is removed by scraper blades 21 and drops down in the space between the heating radiators 13.

In the course of its passage between the pair of rolls 3, 3' the softened resin on the mat is pressed mechanically into the glass fiber mat 1, which subsequently passes through a calender 25 to attain a certain strength. The laminate obtained in this manner may be cooled so that it is hardened and may be cut for example into plates. Scraper plates 21 are provided in the lower areas of the rolls 3, 3' to scrape-off excess resin and deflect same into containers 33. An inert gas may be conducted through the housing 31 to prevent oxidation of the resin powder during heating.

In order to promote the incorporation of powder within the glass fiber mat, the web 1 is passed, shortly upstream of the roll gap 7, through a vibrating installation 18, which comprises a frame 19 provided with a passage slot 20 for the glass fiber mat. The frame is stationarily suspended from flat springs 34. The guide frame 19 may be moved back and forth by means of a drive 28 and a lever 35 supported by pivot pin 36 so as to be pivotable in the direction of the arrows 37. Thus, the glass fiber mat 1 is also vibrated, whereby the glass fiber mat is exposed symmetrically on both sides to the application of the resin powder. To prevent the emission of dust, covers (not shown) may be provided between the frame 19 and the vessels 6, 6', the covers carrying elastic gaskets which rest against the vessels 6, 6'. The covers would include walls facing the rolls 2, 2', which walls being inclined obliquely in relation to the glass fiber mat, in order to suitably deflect any powder that may be thrown partially in the upward direction behind the wire 12.

It will be appreciated that in accordance with the present invention, a metered amount of powdered resin is symmetrically and uniformly applied to both sides of the web. The resin is subsequently softened and able to penetrate the mat without the inclusion of air bubbles. Mechanical pressing of the powder and mat does not occur until after the powder has been thrown into the voids of the mat, thereby minimizing the presence of air in the mat. The invention makes possible a particularly simple and effective impregnation of glass fiber mats that cannot be placed under a tensile stress. Due to the vertical conveyance of the glass fiber mat 1, air bubbles are able to escape in the upward direction. Following passage through the pair of rolls 3, 3', a laminate web, uniformly penetrated and impregnated by resin leaves the apparatus.

Figure 2:
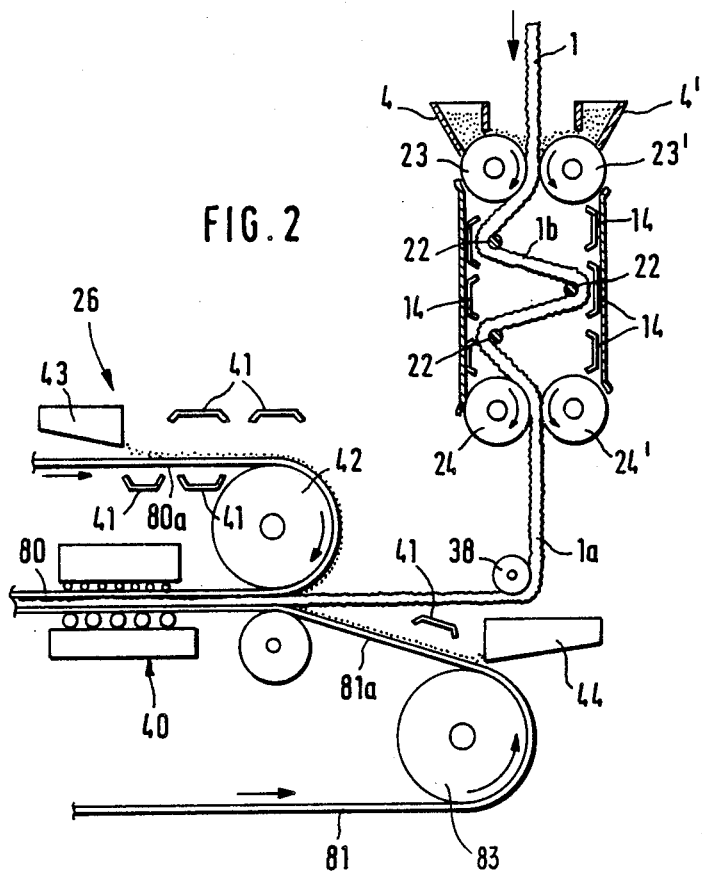
FIG. 2 is a view of another apparatus for impregnating a glass fiber mat wherein the mat is conducted in a zigzag manner and subsequently processed in a twin belt press.

FIG. 2 shows that the laminate web 1a, upon leaving the resin powder application installation may be diverted from its initially vertical orientation to an approximately horizontal orientation by traveling around a reversing roll 38. The web is then conveyed to a twin belt press 26. Advantageously, the twin belt press 26 is laid out in a manner such that resin in powder form is dispensed onto the upper flight 80a of the upper endless belt 80 and the upper flight 81a of the lower endless belt 81. The powder is preheated prior to reaching the press zone 40 by means of heating radiators 41 or heated reversing rolls 83, 42 at least to the extent that it is plasticized and adheres to the belt during its reversal around the roll. In the process, the resin is applied in metered fashion from suitable dispensing installations 43 and 44 to form flat layers on the belts of the twin belt press 26.

In order to further improve the application of the powdered resin in the first powder application installation, heated rods 22 are provided downstream of the upper pair of rolls 23, 23'. Those rods, together with the resin powder vessels 4, 4', correspond in configuration and mode of operation to the embodiment described in connection with FIG. 1. The rods serve as guides for the glass fiber mat 1 in the zone between the roll pairs 23, 23' and 24, 24', whereby the glass fiber mat is caused to travel in a zigzag motion. The guided sections 1b of the glass fiber mat obtained in this manner, which are not vertical but inclined, are capable of capturing the freely falling powder not yet adhering to the glass fiber mat, so that the powder is readily able to penetrate into the glass fiber mat 1 under the effect of the heat of the radiators 14 as the mat travels to the second pair of rolls 24, 24'. Since there is no mechanical action of pressure means on the glass fiber mat and resin until after the resin has been inserted into the mat, no air bubbles are included in this mode of impregnation.

Figure 3:
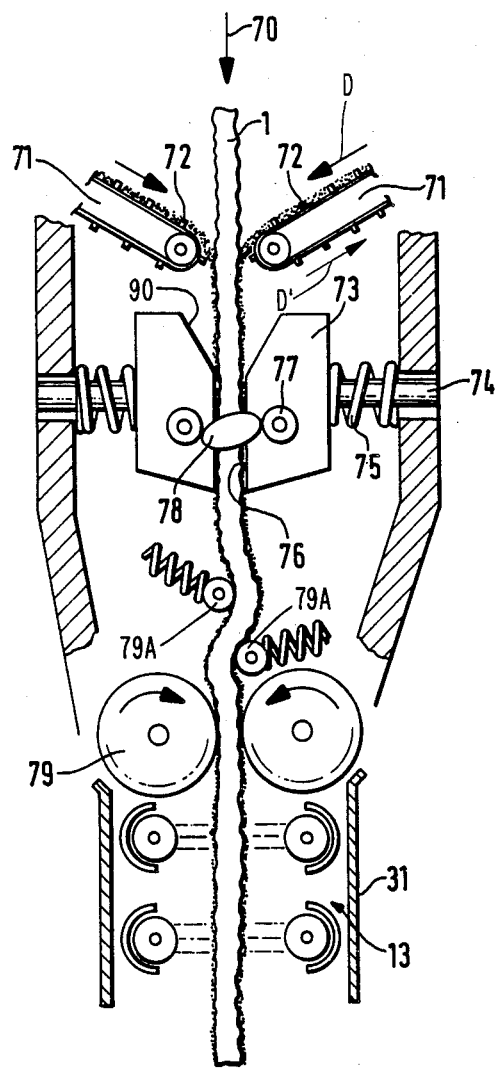
FIG. 3 is a vertical section through yet another embodiment for impregnating a glass fiber mat.

FIG. 3 shows a further embodiment of an apparatus for carrying out the invention. In this apparatus the powder is applied, not from the direction of the surface of the rotating rolls, but from the upper flights of two conveyor belts 71 arranged at a slight inclination to the direction of transport 70 of the web 1 of the glass fiber mat. Resin is placed on the two conveyor belts in uniform layers and is held by transverse ribs 72. The resin is thrown from the upper flights of the very rapidly rotating conveyor belts 71 against the outer sides of the glass fiber mat as the letters change in direction from D to D'. Since significantly higher centrifugal forces may be applied to the powder as compared to the embodiment disclosed in connection with FIG. 1, this apparatus is particularly well suited for relatively dense glass fiber mats, for example for needled glass fiber mats, which can only be effectively penetrated by powder thrown with a higher kinetic energy.

The powder thrown against, but not yet penetrated into the glass fiber mat is subsequently forced into the glass fiber mat by means of a type of vibrating device comprising two jaws 73 moving in opposing directions. The jaws are guided by means of guide pins 74 for travel perpendicularly to the direction of motion 70 of the glass fiber mat and are pressed by the action of springs 75 against the glass fiber mat from opposite sides. The jaws are biased toward each other by springs 75 to form a gap 76 between the jaws. Lateral guide rolls 77 on the jaws bear against a continuously rotating cam 78, which causes the width of the gap 76 to vary with a relatively high frequency. The glass fiber mat 1 is drawn through the gap 76 whenever the gap is of a size permitting the free passage of the web 1. This is effected by means of two continuously rotatably driven rolls 79 driven in opposing directions, with the web being guided between the jaws 73 and the rolls 79 in an approximately S-shaped pattern by spring-biased jockey rollers 79A so that an adequate length of web is available to produce an accumulation of web. Thus, when the web is unclamped from the jaws, the web is advanced by the rolls 79 and the jockey rolls 79A are extended by their springs to produce an accumulation of web as depicted in FIG. 3. During the periods when the web is clamped by the jaws 73, the rolls 79 advance the accumulated web, whereby the web straightens out by retracting the jockey rolls 79A against the action of their springs.

The configuration of the rest of the apparatus according to FIG. 3 may correspond basically to that of FIG. 1. Following the rolls 79, for example, the radiator layout 13 and a second pair or rolls may be provided. In front of the conveyor belts 71, heating installations may be provided whereby the glass fiber mat 1 may be preheated to a certain extent.

The jaws 73 are equipped with inlet slopes 90 extending symmetrically with respect to the web 1 to capture the powder spun-off the glass fiber mat and guide it into the parallel gap 76 between the jaws 73.

Although the present invention has been described in connection with preferred embodiments thereof, it will be appreciated by those skilled in the art that modifications, substitutions, additions and deletions not specifically described, may be made without departing from the spirit and scope of the invention as defined in the appended claims.

What I claim is:

1. Apparatus for producing fiber web-reinforced plastic comprising:
   means for advancing a fibrous web generally vertically, and
   a pair of powder-throwing means comprising mutually opposed first rolls rotatable about parallel axes, disposed on opposite sides of the generally vertically advancing web, each of said first rolls comprising:
      a powder-throwing surface movable in a first direction in converging relationship with a respective side of said web, and then in a second direction in non-converging relationship with said respective web side, a width of said surface approximately corresponding to a web width,
      powder depositing means arranged above said surface for loosely depositing plastic powder onto said surface as said surface travels beneath said depositing means, so that plastic powder is loosely carried on said surface, and
      drive means for moving said surface and plastic powder loosely carried thereby in said first direction such that said loosely carried powder is thrown against said respective web side as said surface changes from said first to said second direction, said thrown powder entering said respective web side,
   an additional pair of rollers spaced vertically below said first rolls and disposed on opposite sides of said web downstream of said first rolls, heating means disposed between said first rolls and said additional rolls for heating said web and plastic powder contained therein, means disposed downstream of said heating means for urging said web and powder together under an influence of heat and pressure, and means disposed between said first rolls and said additional rolls of guiding said web in a zigzag direction of travel.

2. Apparatus for producing fiber web-reinforced plastic comprising:

means for advancing a fibrous web generally vertically, and a pair of powder-throwing means comprising mutually opposed first rolls rotatable about parallel axes, disposed on opposite sides of the generally vertically advancing web, each of said first rolls comprising:

a powder-throwing surface movable in a first direction in converging relationship with a respective side of said web, and then in a second direction in non-converging relationship with said respective web side, a width of said surface approximately corresponding to a web width, powder depositing means arranged above said surface for loosely depositing plastic powder onto said surface as said surface travels beneath said depositing means, so that plastic powder is loosely carried on said surface, and drive means for moving said surface and plastic powder loosely carried thereby in said first direction such that said loosely carried powder is thrown against said respective web side as said surface changes from said first to said second direction, said thrown powder entering said respective web side, an additional pair of rollers spaced vertically below said first rolls and disposed on opposite sides of said web downstream of said first rolls, heating means disposed between said first rolls and said additional rolls for heating said web and plastic powder contained therein, said heating means comprising infrared radiant heaters having quartz tubes which are cooled on their sides facing said web, reflectors disposed on sides of said heaters opposite said web, and means disposed downstream of said heating means for urging said web and powder together under an influence of heat and pressure.

3. Apparatus according to claim 2 including heating means disposed upstream of said first rolls.

4. Apparatus according to claim 2 including vibrating means for vibrating a portion of said web disposed immediately upstream of said first rolls.

5. Apparatus according to claim 4, wherein said vibrating means comprises a guide frame having a slot for the passage of said web, and means for oscillating said guide frame laterally.

6. Apparatus according to claim 2 including scraper means for scraping excess powder from said first rolls.

7. Apparatus according to claim 2 including calender means downstream of said additional rolls, said web arranged to pass through said calender means.

8. Apparatus according to claim 2, wherein said first rolls and said additional rolls are heated.

9. Apparatus according to claim 2 including a housing enclosing a space formed between said first rolls and said additional rolls, said housing containing inert gas.

10. Apparatus according to claim 2 including means urging said first rolls toward one another with a variable force.

11. Apparatus according to claim 2 including a pair of transversely movable web-contacting members disposed on opposite sides of said web above said powder-throwing means, said members defining a slot through which said web travels, means for moving said members in opposite directions to intermittently compress said web, said members each including a sloped inlet surface for guiding powder toward said web.

12. Apparatus according to claim 11 including springs for biasing said members toward one another, and means for periodically urging said members apart against the bias of said springs.

13. Apparatus for producing fiber web-reinforced plastic comprising:

means for advancing a fibrous web generally vertically, and a pair of powder-throwing means comprising mutually opposed rolls rotatable about parallel axes, disposed on opposite sides of the generally vertically advancing web, each of said rolls comprising:

a powder-throwing surface movable in a first direction in converging relationship with a respective side of said web, and then in a second direction in non-converging relationship with said respective web side, a width of said surface approximately corresponding to a web width, powder depositing means arranged above said surface for loosely depositing plastic powder onto said surface as said surface travels beneath said depositing means, so that plastic powder is loosely carried on said surface, and drive means for moving said surface and plastic powder loosely carried thereby in said first direction such that said loosely carried powder is thrown against said respective web side as said surface changed from said first to said second direction, said thrown powder entering said respective web side, heating means disposed downstream of said powder-throwing means for heating said web and plastic powder contained therein, means disposed downstream of said heating means for urging said web and powder together under an influence of heat and pressure, and vibrating means for vibrating a portion of said web disposed immediately upstream of said rolls.

14. Apparatus for producing fiber web-reinforced plastic comprising:

means for advancing a fibrous web generally vertically, and a pair of powder-throwing means comprising mutually opposed first rolls rotatable about parallel axes, disposed on opposite sides of the generally vertically advancing web, each of said first rolls comprising:

a powder-throwing surface movable in a first direction in converging relationship with a respective side of said web, and then in a second direction in non-converging relationship with said respective web side, a width of said surface approximately corresponding to a web width, powder depositing means arranged above said surface for loosely depositing plastic powder onto said surface as said surface travels beneath said depositing means, so that plastic powder is loosely carried on said surface, drive means for moving said surface and plastic powder loosely carried thereby in said first direction such that said loosely carried powder is thrown against said respective web side as said surface changes from said first to said second direction, said thrown powder entering said respective web side, and means defining a weir above said peripheral surface such that powder flows over said weir prior to being thrown against said web, heating means disposed between said first rolls and an additional pair of rolls for heating said web and plastic powder contained therein, and means disposed downstream of said heating means for urging said web and powder together under an influence of heat and pressure.

15. Apparatus according to claim 14, wherein said heating means comprises radiant heaters which include reflectors disposed on sides of said heaters opposite said web.

16. Apparatus according to claim 15, wherein said heating means comprise infrared radiant heaters having quartz tubes which are cooled on their sides facing said web.

17. Apparatus according to claim 14 wherein said additional pair of rolls are spaced vertically below said first rolls and disposed on opposite sides of said web downstream of said first rolls, said heating means disposed between said pairs of rolls.

18. Apparatus for producing fiber web-reinforced plastic comprising:

means for advancing a fibrous web generally vertically, and a pair of powder-throwing means disposed on opposite sides of the generally vertically advancing web, each of said powder throwing means comprising:

a powder-throwing surface movable in a first direction in converging relationship with a respective side of said web, and then in a second direction in non-converging relationship with said respective web side, a width of said surface approximately corresponding to a web width, powder depositing means arranged above said surface for loosely depositing plastic powder onto said surface as said surface travels beneath said depositing means, so that plastic powder is loosely carried on said surface, and drive means for moving said surface and plastic powder loosely carried thereby in said first direction such that said loosely carried powder is thrown against said respective web side s said surface changes from said first to said second direction, said thrown powder entering said respective web side, heating means for heating said web and plastic powder contained therein, means disposed downstream of said heating means for urging said web and powder together under an influence of heat and pressure, and a pair of transversely movable web-contacting members disposed on opposite sides of said web above said powder throwing means, said members defining a slot through which said web travels, means for moving said members in opposite directions to intermittently compress said web, said members each including a sloped inlet surface for guiding powder toward said web, springs for biasing said members toward one another, and means for periodically urging said members apart against the bias of said springs.

19. Apparatus according to claim 18 wherein said surfaces comprise peripheral surfaces of a pair of mutually opposed rolls rotating about parallel axes.

20. Apparatus according to claim 19 wherein said powder-throwing means comprises mutually opposed rolls, powder depositing means comprises vessels disposed adjacent an outer peripheral surface of respective ones of said rolls, each vessel including a trailing wall forming an outlet slot to allow powder to exit said vessel.

21. Apparatus according to claim 19 including means defining a weir above each of said peripheral surfaces such that powder flows over said weir prior to being thrown against said web.

22. Apparatus according to claim 21 wherein said weir comprises a piece of straight wire contacting the respective peripheral surface.

23. Apparatus according to claim 18 wherein said powder throwing surfaces comprise moving endless belts.

* * * * *